United States Patent
Sugiyama et al.

(10) Patent No.: US 7,286,808 B2
(45) Date of Patent: Oct. 23, 2007

(54) BROADCAST RECEIVING SYSTEM AND BROADCAST RECEIVING METHOD

(75) Inventors: Mitsuhiro Sugiyama, Atsugi (JP);
Hayato Shibano, Atsugi (JP);
Toshikazu Ogino, Atsugi (JP);
Kiminori Nakamura, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 536 days.

(21) Appl. No.: 10/884,078

(22) Filed: Jul. 2, 2004

(65) Prior Publication Data

US 2005/0059370 A1 Mar. 17, 2005

(30) Foreign Application Priority Data

Aug. 28, 2003 (JP) ............................. 2003-305143
Dec. 1, 2003 (JP) ............................. 2003-401794

(51) Int. Cl.
*H04B 1/06* (2006.01)
(52) U.S. Cl. ................ 455/275; 455/150.1; 455/168.1; 455/272; 348/725; 348/729
(58) Field of Classification Search ............ 455/150.1, 455/143, 272, 274, 275, 276.1, 500, 526, 455/132, 133, 136, 142, 144, 188.1, 190.1; 348/729, 725
See application file for complete search history.

(56) References Cited

U.S. PATENT DOCUMENTS

| | | | | |
|---|---|---|---|---|
| 4,272,788 A | * | 6/1981 | Ogita | .......................... 348/729 |
| 4,881,272 A | * | 11/1989 | Eguchi | .......................... 455/143 |
| 5,146,338 A | * | 9/1992 | Lehmann et al. | ........... 348/729 |
| 6,020,936 A | * | 2/2000 | Brekelmans | ................. 348/725 |
| 6,044,251 A | * | 3/2000 | Brekelmans | ............. 455/150.1 |
| 6,731,348 B2 | * | 5/2004 | Osada et al. | ................. 348/729 |
| 6,871,052 B2 | * | 3/2005 | Spencer et al. | ........... 455/226.2 |

FOREIGN PATENT DOCUMENTS

| | | | | |
|---|---|---|---|---|
| JP | 09200068 A | * | 7/1997 |
| JP | 2001119222 A | * | 4/2001 |
| JP | 2003087137 A | * | 3/2003 |

\* cited by examiner

*Primary Examiner*—Edan Orgad
*Assistant Examiner*—Junpeng Chen
(74) *Attorney, Agent, or Firm*—Ladas & Parry LLP

(57) ABSTRACT

In a broadcast receiving system, a first antenna receives a broadcast signal of a first frequency band and a second antenna receives a signal of a second frequency band different from the first frequency band. A frequency conversion unit converts the signal of the second frequency band into a second signal of the first frequency band. A selection unit selects one of the broadcast signal output from the first antenna and the second signal output from the frequency conversion unit. A demodulation unit demodulates the one of the broadcast signal and the second signal selected by the selection unit.

6 Claims, 8 Drawing Sheets

BROADCAST RECEIVING SYSTEM AND BROADCAST RECEIVING METHOD

CROSS-REFERENCE TO RELATED APPLICATIONS

This application is based upon and claims the benefit of priority from the prior Japanese application No. 2003-305143, filed on Aug. 28, 2003, and the prior Japanese application No. 2003-401794, filed on Dec. 1, 2003, the entire contents of which are incorporated herein by reference.

BACKGROUND OF THE INVENTION

1. Field of the Invention

The present invention generally relates to a broadcast receiving system, and more particularly to a broadcast receiving system which receives two or more signals of different frequency bands.

2. Description of the Related Art

In recent years, with the spreading of information processing systems, such as personal computers, the implementation of information processing systems to receiving various kinds of broadcasts including FM broadcasting is performed. However, the information processing systems originally are not produced for reproducing the audio signals, they have the problem in that the quality of the audio signals outputted is degraded.

In order to overcome the problem, the method is proposed in which the broadcast signal received by the information processing system is converted into a signal of a predetermined high frequency, the resulting high-frequency signal is transmitted to an audio system, such as "mini-compo", and the high-frequency signal received by the audio system is converted again into the broadcast signal with the original frequency so that the demodulation of the broadcast signal is performed.

Such a method is known from, for example, Japanese Laid-Open Patent Application No. 2002-044776.

FIG. 9 shows the composition of a conventional broadcast receiving system.

As shown in FIG. 9, the broadcast receiving system 500 is provided for receiving the FM broadcast signal, and this system is incorporated in an audio system. The broadcast receiving system 500 is equipped with the antenna 502, the FM tuner 504, the antenna 506, the frequency converter 508, and the FM tuner 510.

The antenna 502 receives the FM broadcast signal and outputs it to the FM tuner 504. The FM tuner 504 demodulates the FM broadcast signal and outputs the audio signal.

On the other hand, when the information processing system converts a broadcast signal received by itself into a signal of a predetermined high frequency and transmits again the high frequency signal, the antenna 506 receives the high frequency signal concerned, and outputs it to the frequency converter 508.

The frequency converter 508 converts the received high frequency signal into the signal of the FM frequency band, and outputs it to the FM tuner 510. The FM tuner 510 demodulates the signal of the FM frequency band output from the frequency converter 508, and outputs the audio signal.

However, the conventional broadcast receiving system 500 requires both the tuner 504 which demodulates the directly received broadcast signal and the tuner 510 which demodulates the signal that is acquired by carrying out the frequency conversion of the high frequency signal transmitted by the information processing system. It is difficult for the conventional broadcast receiving system to provide the miniaturization of the device and the cost reduction because of the use of the multiple tuners.

SUMMARY OF THE INVENTION

An object of the present invention is to provide an improved broadcast receiving system in which the above-mentioned problems are eliminated.

Another object of the present invention is to provide a broadcast receiving system which provides the miniaturization and the cost reduction while providing the demodulation of both the directly received broadcast signal and the frequency-converted signal.

Another object of the present invention is to provide a broadcast receiving method which provides the miniaturization and the cost reduction while providing the demodulation of both the directly received broadcast signal and the frequency-converted signal.

The above-mentioned objects of the present invention are achieved by a broadcast receiving system comprising: a first antenna receiving a broadcast signal of a first frequency band; a second antenna receiving a signal of a second frequency band different from the first frequency band; a frequency conversion unit converting the signal of the second frequency band into a second signal of the first frequency band; a selection unit selecting one of the broadcast signal output from the first antenna and the second signal output from the frequency conversion unit; and a demodulation unit demodulating said one of the broadcast signal and the second signal selected by the selection unit.

Moreover, the selection unit may comprise: a first switch provided between the first antenna and the demodulation unit wherein the first switch is turned ON when the broadcast signal output from the first antenna is selected, and turned OFF when the second signal output from the frequency conversion unit is selected; and a second switch provided between the frequency conversion unit and the demodulation unit wherein the second switch is turned ON when the second signal output from the frequency conversion unit is selected, and turned OFF when the broadcast signal output from the first antenna is selected.

Moreover, the broadcast receiving system may further comprise a third switch provided between the first antenna and the selection unit wherein the third switch is switched when the second signal output from the frequency conversion unit is selected by the selection unit, so that the broadcast signal output from the first antenna is not supplied to the selection unit.

Moreover, the third switch may be provided to send the broadcast signal output from the first antenna to a ground when the second signal output from the frequency conversion unit is selected by the selection unit.

Moreover, the frequency conversion unit may be provided to stop frequency conversion operation when the broadcast signal output from the first antenna is selected by the selection unit.

Moreover, the broadcast signal of the first frequency band may be any of an FM broadcasting signal, a television broadcasting signal and an AM broadcasting signal, and the signal of the second frequency band may be a radio signal of a local area network.

The above-mentioned objects of the present invention are achieved by a broadcast receiving method comprising the steps of: receiving a broadcast signal of a first frequency band and receiving a signal of a second frequency band different from the first frequency band; converting the signal of the second frequency band into a second signal of the first frequency band; selecting one of the received broadcast signal and the second signal obtained by the frequency conversion; and demodulating the one of the received broadcast signal and the second signal which is selected in the selecting step.

According to the present invention, the broadcast signals of the first and second frequency bands are demodulated with a single demodulation unit, and the miniaturization of the device and the cost reduction is possible.

Moreover, according to the present invention, when the output of the frequency conversion unit is chosen, the third switch is provided to send the broadcast signal from the first antenna to the ground, and it is possible to reduce the leaking of the broadcast signal of the first frequency band to the demodulation unit.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

The broadcast receiving system of the present invention is incorporated in an audio system, such as "mini-compo". Only a single FM tuner is provided in this broadcast receiving system for the demodulation of both the directly received FM broadcasting signal and the broadcasting signal that is acquired by carrying out the frequency conversion of the high frequency signal transmitted by the information processing system, such as a personal computer.

Figure 1:
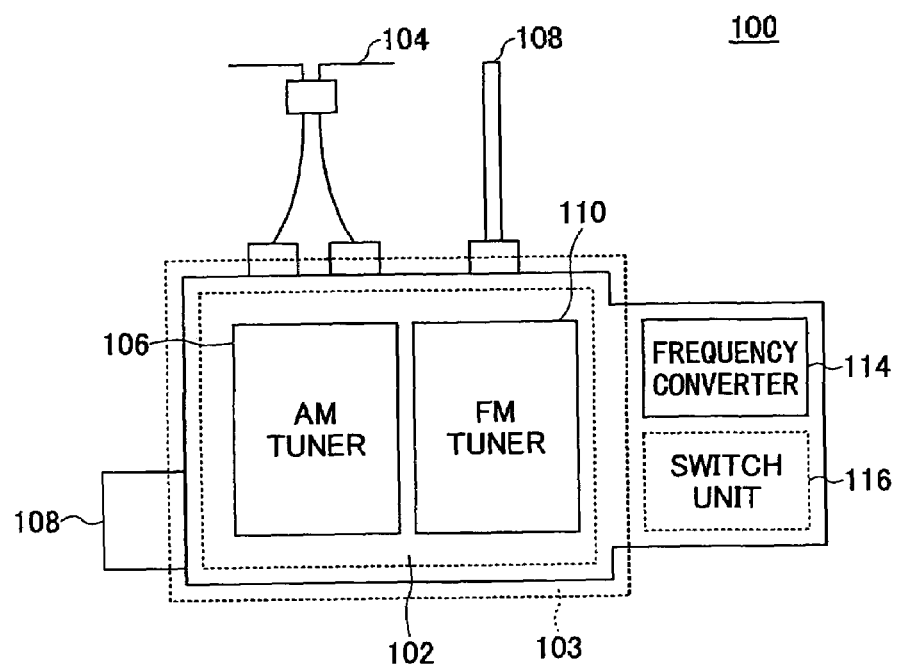
FIG. 1 is a top view of the broadcast receiving system of the present invention.
Figure 2:
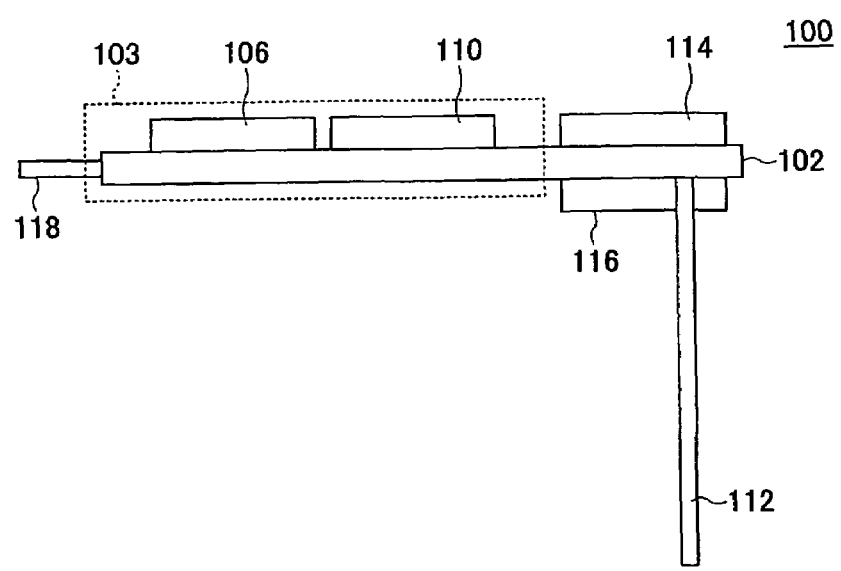
FIG. 2 is a side view of the broadcast receiving system of the present invention.

FIG. 1 is a top view of the broadcast receiving system of the present invention, and FIG. 2 is a side view of the broadcast receiving system of the present invention.

The broadcast receiving system 100 shown in FIG. 1 and FIG. 2 is an example of the broadcast receiving system which can receive the AM broadcast signal and the FM broadcast signal.

The broadcast receiving system 100 comprises a substrate 102 and various elements provided on the substrate 102. The elements provided on the substrate 102 include an AM antenna 102, an AM tuner 106, an FM antenna 108, an FM tuner 110, a high frequency antenna 112, a frequency converter 114, a switch unit 116, and a connection unit 118.

In addition, the region where the AM tuner 106 and the FM tuner 110 are arranged on the substrate 102 is covered with a shielding case 103 to protect the AM tuner 106 and the FM tuner 110 against damage. Moreover, the frequency converter 114 is covered with its shielding case for protection.

The AM antenna 104 receives the AM broadcast signal. The AM tuner 106 demodulates the AM broadcast signal received by the AM antenna 104. The connection unit 118 is an external connection terminal which connects other devices (for example, the CPU, the speaker, etc.) within the audio system to the broadcast receiving system 100.

Next, a description will be given of the processing of the FM antenna 108, the FM tuner 110, the high frequency antenna 112, the frequency converter 114, and the switch unit 116 with reference to FIG. 3 and FIG. 4.

Figure 3:
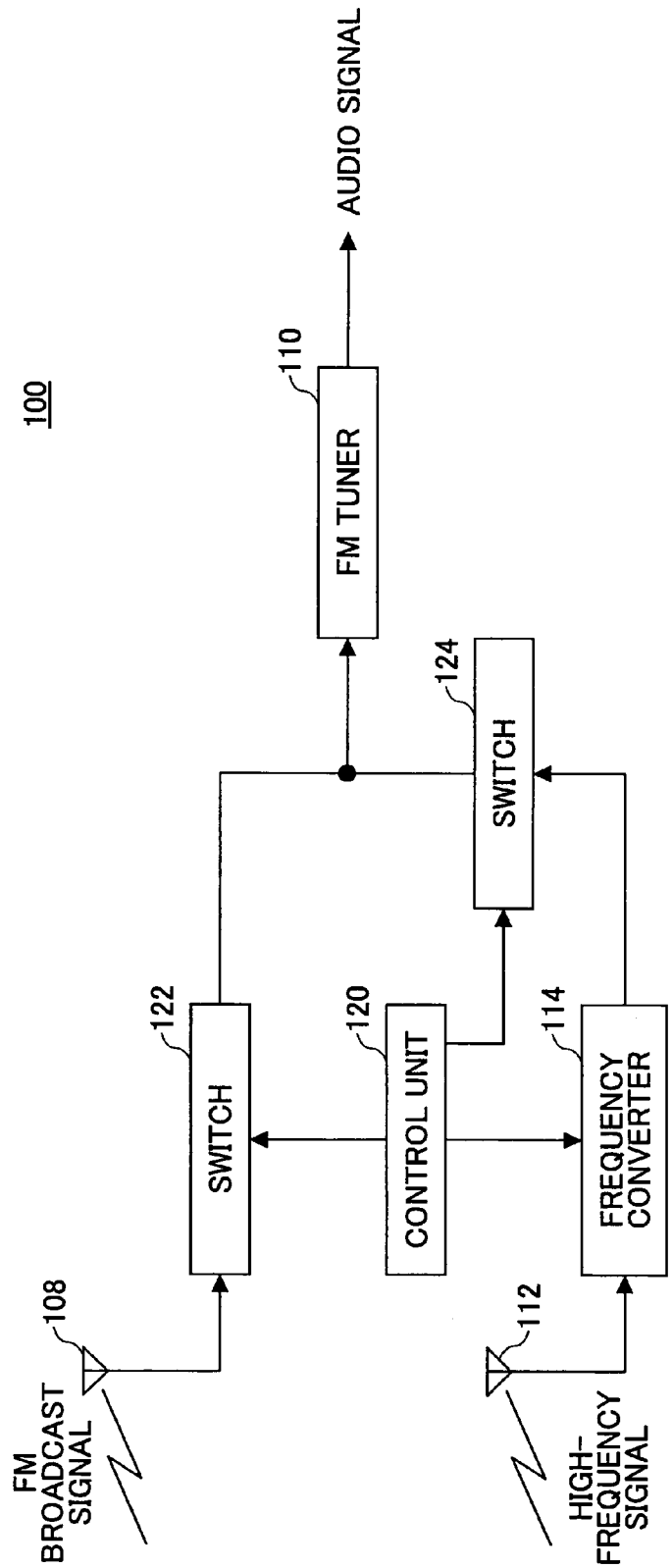
FIG. 3 is a block diagram showing the functional composition of the broadcast receiving system in one preferred embodiment of the invention.

FIG. 3 shows the composition of the broadcast receiving system 100 in one preferred embodiment of the invention. For the sake of convenience of description, only the composition related to the reception of the FM broadcast signal is illustrated in the broadcast receiving system 100 of FIG. 3.

As shown in FIG. 3, the broadcast receiving system 100 of this embodiment comprises the FM antenna 108, the FM tuner 110, the high frequency antenna 112, the frequency converter 114, the control unit 120, and the switches 122 and 124. Among these elements, the switches 122 and 124 constitute the switch unit 116 shown in FIG. 1.

The FM antenna 108 receives the FM broadcast signal of a first frequency band (for example, the signal frequency is in the range of 88 MHz-108 MHz). The FM broadcast signal received by the FM antenna 108 is inputted to the switch 122.

On the other hand, the high frequency antenna 112 receives the high frequency signal when the information processing system, such as a personal computer, converts the FM broadcast signal received by itself into a predetermined high frequency signal of a second frequency band and transmits it again. The frequency of the high frequency signal is, for example, in the 900 MHz band. The high frequency signal received by the high frequency antenna 112 is inputted to the frequency converter 114.

The control unit 120 controls the frequency converter 114 and the switches 122 and 124 so that the control unit 120 selects one of the FM broadcast signal received by the FM antenna 108, and the high frequency signal received by the high frequency antenna 112 in order to output the audio signal from the selected signal. The control of the frequency converter 114 and the switches 122 and 124 is carried out by the control unit 120 in response to the operational command of the user of the audio system for example.

Next, a description will be given of the switch 122 in the broadcast receiving system 100.

Figure 4:
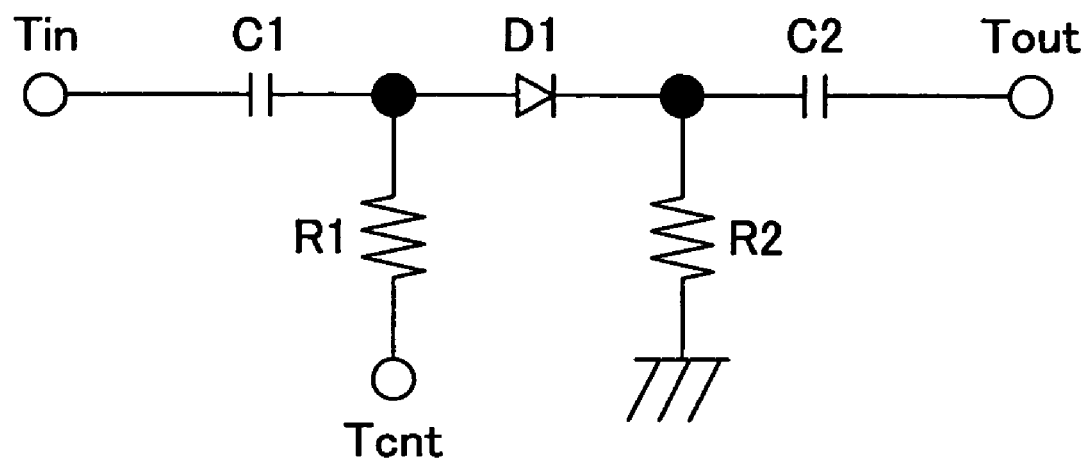
FIG. 4 is a circuit diagram showing the composition of a switch in the broadcast receiving system of FIG. 3.

FIG. 4 shows the circuit composition of the switch 122. As shown in FIG. 4, the switch 122 comprises the capacitors C1 and C2, the diode D1, and the resistors R1 and R2.

The FM broadcast signal from the FM antenna 108 is supplied to the input terminal Tin. The capacitor C1 is connected at one end to the input terminal Tin and connected at the other end to the anode of the diode D1. The capacitor C1 is provided to prevent the flow of the direct-current components to the input terminal Tin.

The anode of the diode D1 is connected to both the other end of the capacitor C1 and one end of the resistor R1, and the cathode of the diode D1 is connected to both one end of the capacitor C2 and one end of the resistor R2.

The capacitor C2 is connected at one end to the cathode of the diode D1 and the end of the resistor R2, and connected at the other end to the output terminal Tout. The capacitor C2 is provided to prevent the flow of the direct-current components to the output terminal Tout. In addition, the FM tuner 110 shown in FIG. 3 is connected to the output terminal Tout.

The resistor R1 is connected at one end to the junction point between the other end of the capacitor C1 and the anode of the diode D1, and connected at the other end to the control terminal Tcnt. A switching control signal from the control unit 120 is supplied to the control terminal Tcnt.

Moreover, the resistor R2 is connected at one end to the junction point between the cathode of the diode D1 and the end of the capacitor C2, and the other end of the resistor R2 is grounded.

When the switching control signal from the control unit 120 is set at high level, the control terminal Tcnt of the switch 122 is set at high level.

When the control terminal Tcnt is set at high level, the anode of the diode D1 is set at high level and the forward voltage is applied to the diode D1 so that the diode D1 is turned ON.

When the diode D1 is turned ON, the FM broadcast signal supplied to the input terminal Tin from the FM antenna 108 passes through the capacitor C1, the diode D1 and the capacitor C2. The FM broadcasting signal is outputted from the output terminal Tout so that it is supplied to the FM tuner 110. Namely, it is in the state where the switch 122 is turned ON.

On the other hand, when the switching control signal from the control unit 120 is set at low level, the control terminal Tcnt of the switch 122 is set at low level.

If the control terminal Tcnt is set at low level, the anode of the diode D1 is set at low level, and the diode D1 is turned off.

When the diode D1 is turned OFF, the FM broadcast signal supplied to the input terminal Tin from the FM antenna 108 is intercepted at the diode D1. The FM broadcasting signal is not supplied to the FM tuner 110. Namely, it is in the state where the switch 122 is turned OFF.

The composition and operation of the switch 122 in the broadcast receiving system 100 have been described above. The switch 124 in the broadcast receiving system 100 has the composition and operation which is essentially the same as that of the switch 122 described above. For this reason, a description of the switch 124 will be omitted.

Specifically, in the broadcast receiving system 100 of the present embodiment, when the control unit 120 selects the FM broadcast signal received by the FM antenna 108 and outputs the audio signal, the control unit 120 turns ON the switch 122 and turns OFF the switch 124. In this case, the FM broadcast signal received by the FM antenna 108 is inputted to the FM tuner 110 through the switch 122.

On the other hand, in broadcast receiving system 100 of the present embodiment, when the control unit 120 selects the high frequency signal received by the high frequency antenna 112 and outputs the audio signal, the control unit 120 starts operation of the frequency converter 114, turns OFF the switch 122 and turns ON the switch 124. In this case, the frequency converter 114 converts the high frequency signal from the high frequency antenna 112 into the signal of the FM frequency band. The signal of the FM frequency band which is acquired by the frequency converter 114 is inputted to the FM tuner 110 from the frequency converter 114 through the switch 124.

The FM tuner 110 demodulates the signal received at its input and outputs the audio signal.

Specifically, when the switch 122 is turned ON and the switch 124 is turned OFF, the FM tuner 110 demodulates the FM broadcast signal received by the FM antenna 108 and outputs the audio signal.

On the other hand, when the switch 122 is turned OFF and the switch 124 is turned ON while the frequency converter 114 is started, the FM tuner 110 demodulates the signal of the FM frequency band, which is received by the high frequency antenna 112 and created by the frequency converter 114, and outputs the audio signal.

Figure 5:
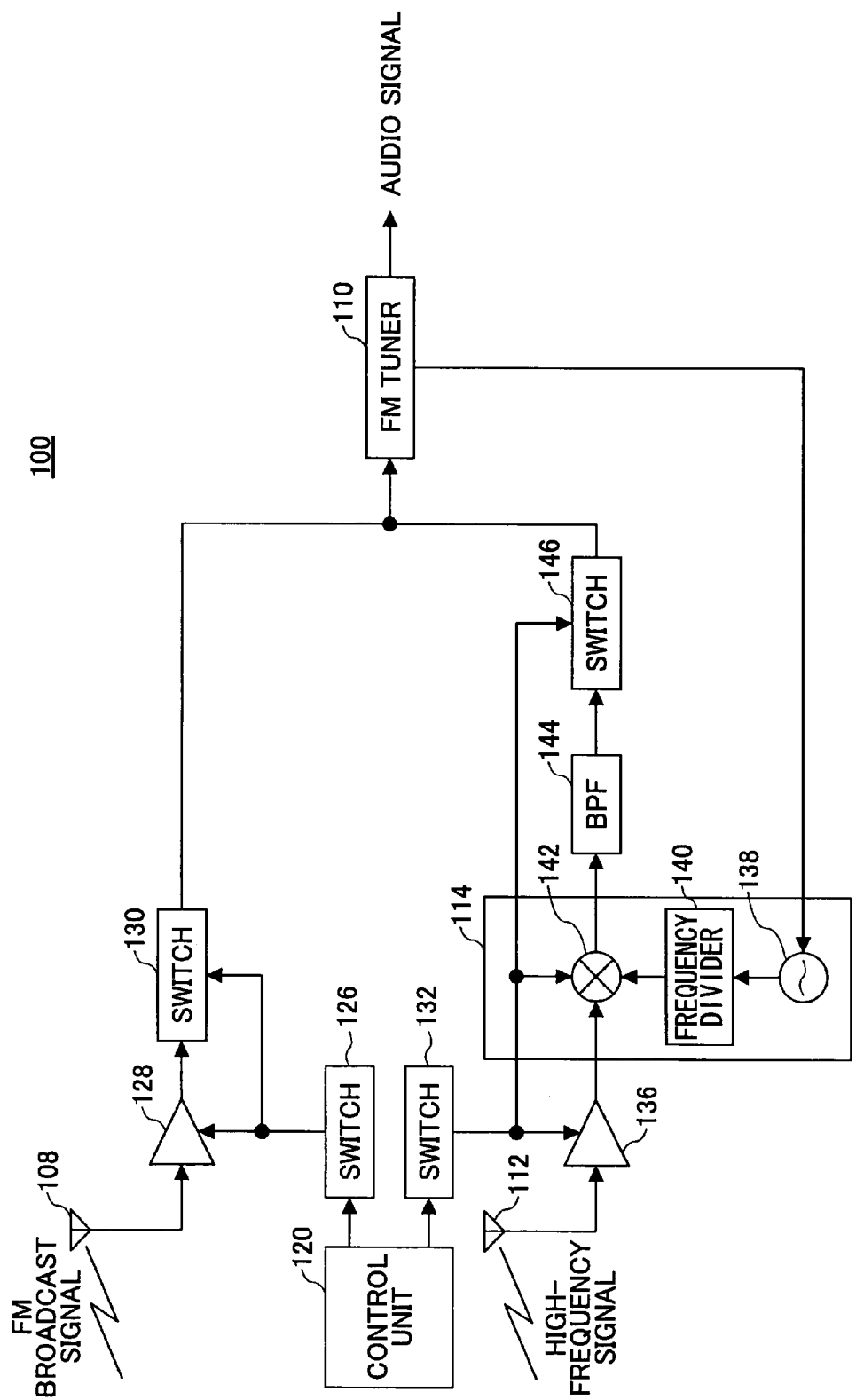
FIG. 5 is a block diagram showing the detailed composition of the broadcast receiving system of the present embodiment.

FIG. 5 shows the detailed composition of the broadcast receiving system 100 in the present embodiment.

The broadcast receiving system 100 shown in FIG. 5 is provided as the detailed composition of the broadcast receiving system 100 shown in FIG. 3.

The broadcast receiving system 100 comprises the FM antenna 108, the FM tuner 110, the high frequency antenna 112, the control unit 120, the switches 126, 130, 132 and 146, the amplifier 136, the local oscillator 138, the frequency divider 140, the multiplier 142, and the band pass filter (BPF) 144.

Among the elements of the broadcast receiving system 100, the local oscillator 138, the frequency divider 140 and the multiplier 142 constitute the frequency converter 114 in FIG. 3.

Moreover, the switch 126 and the switch 130 constitute the switch 122 in FIG. 3, and the switch 132 and the switch 146 constitute the switch 124 in FIG. 3.

The FM broadcast signal received by the FM antenna 108 is inputted to the FM tuner 110 through the switch 130.

On the other hand, when the information processing system, such as a personal computer, converts the FM broadcast signal received by itself into the signal of the predetermined high frequency and transmits the high frequency signal, the high frequency signal is received by the high frequency antenna 112 and inputted to the amplifier 136.

In the broadcast receiving system 100, when the control unit 120 selects the FM broadcast signal received by the FM antenna 108 and outputs the audio signal, the control unit 120 turns ON the switch 126 and turns OFF the switch 132. The switch 130 is also turned ON if the switch 126 is turned ON.

On the other hand, when the control unit 120 selects the high frequency signal received by the high frequency antenna 112 and outputs the audio signal, the control unit 120 turns OFF the switch 126 and turns ON the switch 132. If the switch 132 is turned ON, the switch 146 is also turned ON and the amplifier 136 and the multiplier 142 are activated.

In this case, the amplifier 136 amplifies the high frequency signal received by the high frequency antenna 112, and outputs it to the multiplier 142. The local oscillator 138 outputs the signal of a predetermined frequency to the frequency divider 140 according to the control of the FM tuner 110. The frequency divider 140 carries out the frequency dividing of the signal from the local oscillator 138, and outputs the signal of the divided frequency (for example, the doubled frequency) to the multiplier 142.

The multiplier 142 carries out the multiplication of the high frequency signal from the amplifier 136 and the signal from the frequency divider 140, and outputs the resulting signal to the BPF 144. The signal output from the BPF 144 turns into the signal of the FM frequency band.

For example, it is assumed that the frequency of the high frequency signal received by the high frequency antenna 112 is 914 MHz, the frequency of the signal output from the local oscillator 138 is 412.7 MHz, and the frequency divider 140 functions to double the frequency of the signal from the local oscillator 138.

In the above-mentioned case, the signal with the frequency of 914 MHz from the amplifier 136 is inputted to the multiplier 142, and the signal with the frequency of 825.4 MHz from the frequency divider 140 is inputted to the multiplier 142. The multiplier 142 outputs the signal with the frequency of 88.6 MHz which is obtained by subtracting the frequency of 825.4 MHz from the frequency of 914 MHz. Namely, the signal at the output of the multiplier 142 becomes the signal of the FM frequency band.

The BPF 144 removes the noise components from the signal output from the multiplier 142, and passes only the signal of the FM frequency band. The switch 146 is in the ON state and outputs the signal of the FM frequency band from the BPF 144 to the FM tuner 110.

When the switch 130 is turned ON and the switch 146 is turned OFF, the FM tuner 110 demodulates the FM broadcast signal received by the FM antenna 108 and outputs the audio signal.

On the other hand, when the switch 130 is turned OFF and the switch 146 is turned ON, the FM tuner 110 demodulates the signal which is received by the high frequency antenna 112 and converted into the signal of the FM frequency band by the frequency converter 114, and outputs the audio signal.

Accordingly, in the broadcast receiving system 100 of the present embodiment, the single FM tuner 110 is provided for the selective demodulation of one of the FM broadcast signal received directly with the FM antenna 108 and the high frequency signal received when the information processing system converts the FM broadcast signal received by itself into the signal of the predetermined high frequency and transmits it again, so that the FM tuner 110 outputs the audio signal from the selected signal.

Therefore, it is not necessary to use multiple FM tuners as in the conventional system, and the miniaturization of the device and the cost reduction is possible.

In the above-described embodiment, the FM antenna 108 corresponds to the first antenna in the claims, the high frequency antenna 112 corresponds to the second antenna in the claims, the switch unit 116, the control unit 120, and the switches 122, 124, 126, 130, 132 and 146 correspond to the selection unit in the claims, and the FM tuner 110 corresponds to the demodulation unit in the claims.

In addition, in order to prevent the leaking of the FM broadcast signal from the FM antenna 108 to the FM tuner 110, a third switch may be additionally provided in the above-described embodiment so that the third switch functions to send the FM broadcast signal to the ground.

Figure 6:
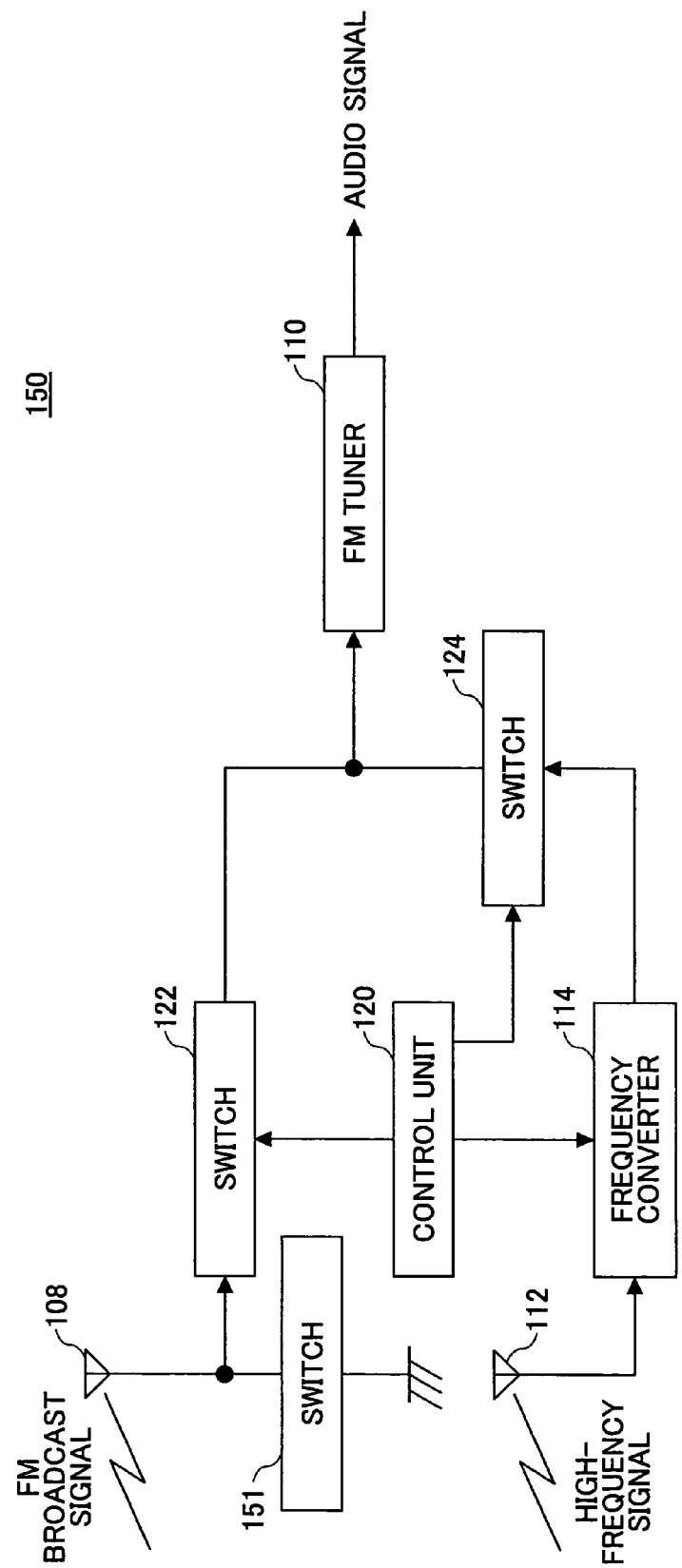
FIG. 6 is a block diagram showing a variation of the functional composition of the broadcast receiving system of the present embodiment.

FIG. 6 shows a variation of the composition of the broadcast receiving system of the present embodiment.

In FIG. 6, the elements which are essentially the same as corresponding elements in FIG. 3 are designated by the same reference numerals, and a description thereof will be omitted.

The broadcast receiving system 150 of this embodiment is provided such that the switch 151 is connected at one end to the junction point between the FM antenna 108 and the switch 122, and connected at the other end to the ground.

Figure 7:
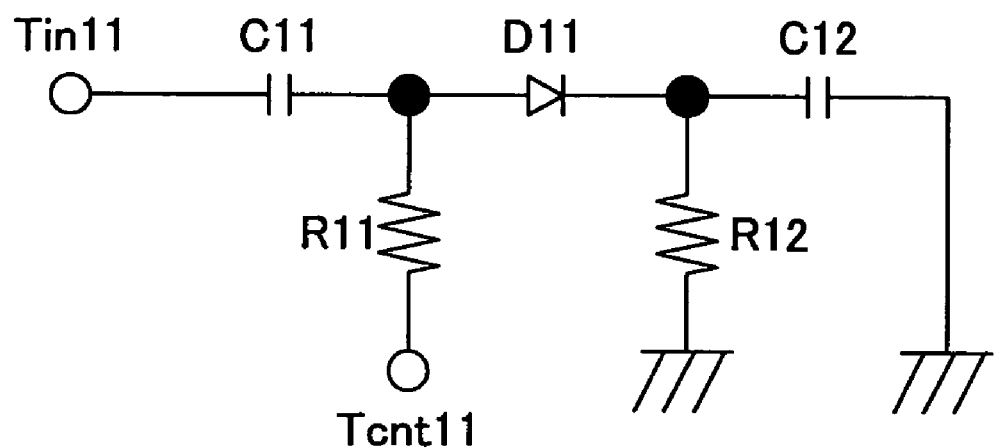
FIG. 7 is a circuit diagram showing the composition of a switch in the broadcast receiving system of FIG. 6.

FIG. 7 shows the composition of the switch 151 in the broadcast receiving system 150 of FIG. 6.

As shown in FIG. 7, the switch 151 comprises the capacitors C11 and C12, the diode D11, and the resistors R11 and R12. The capacitor C11 is connected at one end to the input terminal Tin11. The input terminal Tin11 is connected to the junction point between the FM antenna 108 and the switch 122 in FIG. 6.

The other end of the capacitor C11 is connected to the junction point between the anode of the diode D11 and one end of the resistor R11. The anode of the diode D11 is connected to the junction point between the other end of the capacitor C11 and the end of the resistor R11, and the cathode of the diode D11 is connected to the junction point between one end of the capacitor C12 and one end of the resistor R12.

The capacitor C12 is connected at one end to the junction point between the cathode of the diode D11 and the end of the resistor R12, and connected at the other end to the ground.

Moreover, the resistor R12 is connected at one end to the junction point between the cathode of the diode D11 and the end of the capacitor C12, and connected at the other end to the ground.

In addition, the other end of the resistor R11 is connected to the control terminal Tcnt 11.

The switching control signal from the control unit 120 is supplied to the control terminal Tcnt 11.

When the switching control signal from the control unit 120 is set at high level, the control terminal Tcnt11 of the switch 151 is set at high level.

When the control terminal Tcnt11 is set at high level, the anode of the diode D11 is set at high level, and the forward voltage is applied to the diode D11 so that the diode D11 is turned ON.

When the diode D11 is turned ON, the FM broadcast signal supplied to the input terminal Tin11 from the FM antenna 108 passes through the capacitor C11, the diode D11, and the capacitor C12, so that the FM broadcast signal flows into the ground. Namely, it is in the state where the switch 151 is turned ON.

Moreover, when the switching control signal from the control unit 120 is set at low level, the control terminal Tcnt11 of the switch 151 is set at low level.

When the control terminal Tcnt11 is set at low level, the anode of the diode D11 is set at low level so that the diode D11 is turned OFF.

When the diode D11 is turned OFF, the FM broadcast signal supplied to the input terminal Tin11 from the FM antenna 108 is intercepted at the diode D1, so that the FM broadcast signal is supplied to the switch 122 side. Namely, it is in the state where the switch 151 is turned OFF.

The switch 151 is turned OFF by the control unit 120 when the switch 122 is turned ON and the switch 124 is turned OFF, and the FM broadcast signal received by the FM antenna 108 is supplied to the FM tuner 110 through the switch 122.

On the other hand, when the switch 122 is turned OFF and the switch 124 is turned ON, the switch 151 is turned ON by the control unit 120 so that the FM broadcast signal received by the FM antenna 108 is sent to the ground through the switch 151.

When demodulating the high frequency signal by the FM tuner 110, the FM broadcast signal from the FM antenna 110 flows into the ground through the switch 151 and does not flow into the switch 122 side. Hence, because of the ON state switch 151, the FM broadcast signal from the FM antenna 110 is not supplied to the FM tuner 110 through the switch 122, and, therefore, the FM tuner 110 can perform the reproduction of the high frequency signal without mixing with the FM broadcast signal from the FM antenna 110.

In addition, in the case of the broadcast receiving system 100 of FIG. 3, the receiving sensitivity level of the 98-MHz FM broadcast signal is 47 dB μ V (75 ohms, open) at the time of the high frequency signal receiving operation.

On the other hand, in the case of the broadcast receiving system 150 of FIG. 6, the receiving sensitivity level of the 98-MHz FM broadcast signal is 80 dB μ V (75 ohms, open), and the attenuation becomes very sharp. By this feature, it is avoided that the high frequency signal is overlapped over the FM broadcast signal, and it is possible for the broadcast receiving system of the present embodiment to demodulate the high frequency signal with high precision.

In addition, in the above-described embodiments, the broadcast receiving system which receives the FM broadcast signal has been explained. However, the present invention is applicable similarly to other broadcast receiving systems which receive other various broadcast signals.

Figure 8:
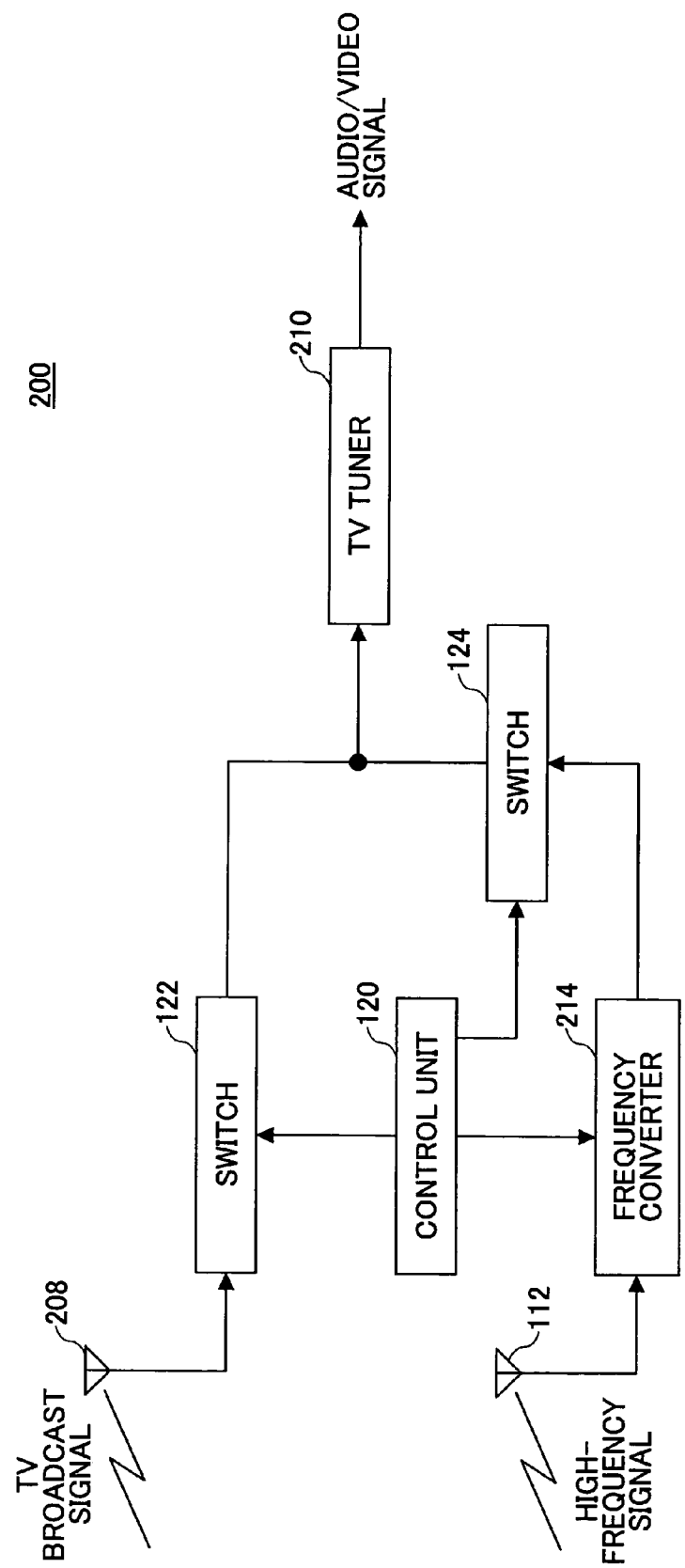
FIG. 8 is a block diagram showing the functional composition of the broadcast receiving system in another preferred embodiment of the invention.
Figure 9:
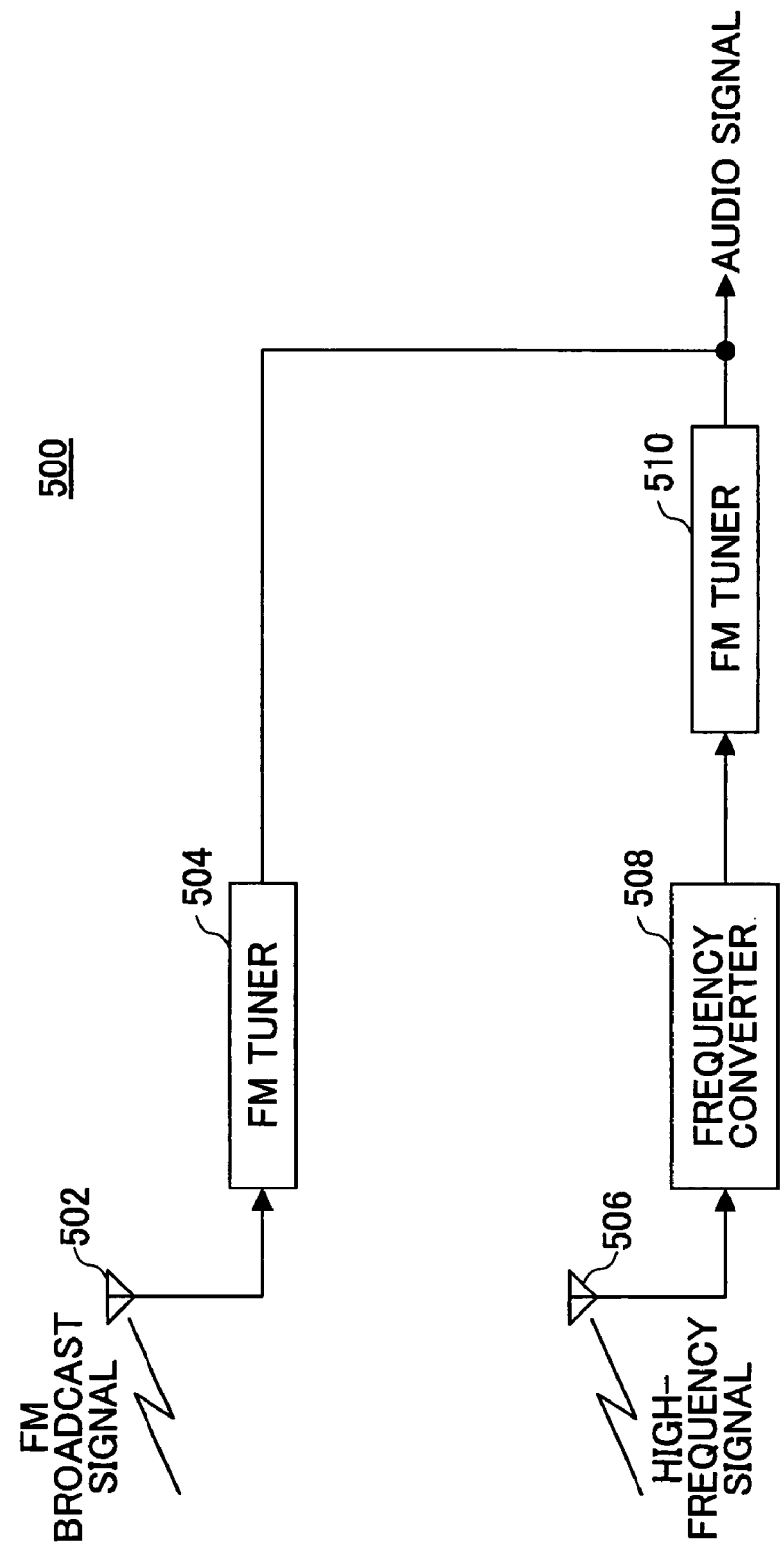
FIG. 9 is a block diagram showing the composition of a conventional broadcast receiving system.

FIG. 8 shows the composition of the broadcast receiving system in another preferred embodiment of the invention which receives the television broadcast signal.

As compared with the broadcast receiving system 100 of FIG. 3, the broadcast receiving system 200 of FIG. 8 comprises the television antenna 208 which receives the television-broadcasting signal, instead of the FM antenna 108, comprises the frequency converter 214 which converts the high frequency signal into the signal of the television broadcasting frequency band, instead of the frequency converter 114, and comprises the television tuner 210 which demodulates the signal inputted and outputs the audio signal and the video signal, instead of the FM tuner 110.

According to the above-described composition of the broadcast receiving system of the present embodiment, it is possible that the single television tuner 210 is provided to selectively demodulate one of the television-broadcasting signal which is received directly with the television antenna 208 and the high frequency signal received when the information processing system converts the television-broadcasting signal received by itself into the signal of a predetermined high frequency and transmits it again, so that the television tuner 210 outputs the audio signal and the video signal from the selected signal.

Moreover, the present invention is applicable similarly to the broadcast receiving system which receives the AM broadcast signal. In this case, it is necessary that the broadcast receiving system comprises the AM antenna which receives the AM broadcast signal, instead of the FM antenna 108 in the broadcast receiving system of FIG. 3, comprises the frequency converter which converts the high frequency signal into the signal of the AM broadcast frequency band, instead of the frequency converter 114, and comprises the AM tuner which demodulate the signal inputted outputs the audio signal, instead of the FM tuner 110.

The present invention is not limited to the above-described embodiments, and variations and modifications may be made without departing from the scope of the present invention.

What is claimed is:

1. A broadcast receiving system, comprising:
   a first antenna receiving a broadcast signal of a first frequency band;
   a second antenna receiving a signal of a second frequency band different from the first frequency band;
   a frequency conversion unit converting the signal of the second frequency band into a second signal of the first frequency band;
   a selection unit selecting one of the broadcast signal output from the first antenna and the second signal output from the frequency conversion unit; and
   a demodulation unit demodulating said one of the broadcast signal and the second signal selected by the selection unit,
   wherein the selection unit comprises:
   a first switch provided between the first antenna and the demodulation unit wherein the first switch is turned ON when the broadcast signal output from the first antenna is selected, and turned OFF when the second signal output from the frequency conversion unit is selected; and
   a second switch provided between the frequency conversion unit and the demodulation unit wherein the second switch is turned ON when the second signal output from the frequency conversion unit is selected, and turned OFF when the broadcast signal output from the first antenna is selected,
   wherein said frequency conversion unit is provided to stop frequency conversion operation simultaneously when the second switch is turned OFF, and to start frequency conversion operation simultaneously when the second switch is turned ON, and
   wherein said demodulation unit has a common input connected to both an output of the first switch and an output of the second switch.

2. The broadcast receiving system according to claim 1 further comprising a third switch provided between the first antenna and the selection unit wherein the third switch is switched when the second signal output from the frequency conversion unit is selected by the selection unit, so that the broadcast signal output from the first antenna is not supplied to the selection unit.

3. The broadcast receiving system according to claim 2 wherein the third switch is provided to send the broadcast signal output from the first antenna to a ground when the second signal output from the frequency conversion unit is selected by the selection unit.

4. The broadcast receiving system according to claim 1 wherein the broadcast signal of the first frequency band is any of an FM broadcasting signal, a television broadcasting signal and an AM broadcasting signal, and the signal of the second frequency band is a radio signal of a local area network.

5. A broadcast receiving method for use in a broadcast receiving system having a demodulation unit, the method comprising the steps of:
   receiving a broadcast signal of a first frequency band by a first antenna and receiving a signal of a second frequency band different from the first frequency band by a second antenna;
   converting the signal of the second frequency band into a second signal of the first frequency band;
   selecting one of the received broadcast signal and the second signal obtained by the frequency conversion; and demodulating said one of the received broadcast signal and the second signal which is selected in the selecting step,
wherein the broadcast receiving system comprises:
a first switch provided between the first antenna and the demodulation unit wherein the first switch is turned ON when the broadcast signal output from the first antenna is selected, and turned OFF when the second signal obtained by the frequency conversion is selected; and
a second switch provided between a frequency conversion unit and a demodulation unit wherein the second switch is turned ON when the second signal output from the frequency conversion unit is selected, and turned OFF when the broadcast signal output from the first antenna is selected,
wherein said frequency conversion unit is provided to stop frequency conversion operation simultaneously when the second switch is turned OFF, and to start frequency conversion operation simultaneously when the second switch is turned ON, and
wherein said demodulation unit has a common input connected to both an output of the first switch and an output of the second switch.

6. The broadcast receiving method according to claim 5 wherein the selecting step is provided to send the received broadcast signal to a ground when the second signal obtained by the frequency conversion is selected in the selecting step.

* * * * *